ance Patent Office 3,509,144
Patented Apr. 28, 1970

3,509,144
TRIHALO- AND TETRAHALOPYRAZINE-1-OXIDES
Howard Johnston, Walnut Creek, Calif., assignor to The Dow Chemical Company, Midland, Mich., a corporation of Delaware
No Drawing. Filed Sept. 16, 1968, Ser. No. 762,343
Int. Cl. C07d 51/76
U.S. Cl. 260—250    6 Claims

ABSTRACT OF THE DISCLOSURE

New halopyrazine-1-oxide compounds are disclosed having the formula

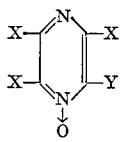

wherein each X is halogen and Y is hydrogen, halogen or alkoxy (—OR), wherein R represents an alkyl group. The compounds hereof are variously useful as pesticides for the control of various plant and other organisms.

SUMMARY OF THE INVENTION

In accordance with the invention, there are provided novel polyhalopyrazine-1-oxide compounds having the formula

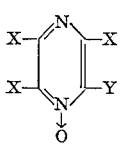

wherein each X is independently a halogen and Y is halogen, hydrogen or alkoxy (—OR), R being an alkyl group. As employed herein and in the claims, "halogen" designates fluorine, chlorine and bromine and "alkyl" designates an alkyl group containing 1, 2, 3, 4, etc. and up to and including 12 carbon atoms, and from 1, to 2, to 3, to 4, etc. and up to and including 12 carbon atoms such as methyl, ethyl, propyl, isopropyl, butyl, isobutyl, sec.-butyl, pentyl, hexyl, sec.-hexyl, heptyl octyl, nonyl decyl, 4-methyldecyl, 2-ethylhexyl, undecyl and dodecyl. The arrow (↓) between the nitrogen and oxygen atoms represents the accepted manner of indicating the nitrogen oxides hereof. The new compounds are oily liquids or crystalline solids, soluble in many organic solvents such as acetone, benzene and ethyl ether and relatively insoluble in water. These compounds have been found useful as pesticides for the control of undesirable plant and insect organisms. They have particular utility as fungicides for the control of a wide variety of fungal organisms.

Representative compounds of the invention include tetrachloropyrazine-1-oxide, tetrabromopyrazine-1-oxide, 2,3,5-trichloropyrazine-1-oxide, 2,3,5-tribromopyrazine-1-oxide, 2,3,5-trifluoropyrazine-1-oxide, tetrafluoropyrazine-1-oxide, 3,5-dichloro-2,6-difluoropyrazine-1-oxide, 3,5-dichloro-2,6-dibromopyrazine-1-oxide, 2,3,5-trichloro-6-methoxypyrazine-1-oxide, 2,3,5-trichloro-6-isopropoxypyrazine-1-oxide, 2,3,5-tribromo-6-(2-ethyl)hexyloxypyrazine-1-oxide, 3,5-dichloro-2-fluoro-6-methoxypyrazine-1-oxide, 2,3,5-trichloro-6-dodecyloxypyrazine-1-oxide.

The compounds of the invention can be prepared from tri- or tetrahalopyrazines. Thus, the tetrahalopyrazine-1-oxides and the unsubstituted trihalopyrazine-1-oxides can be prepared by reaction of a corresponding tri- or tetrahalopyrazine starting material with an oxidizing agent such as hydrogen peroxide in a polar solvent such as, for example, trifluoroacetic acid. In a typical preparation, the reaction mixture, following the addition of the peroxide, usually in excess of that required for preparation of the pyrazine-1-oxide product, is heated for several hours on a steam bath before being poured over ice to separate the desired 1-oxide product which can then be readily recovered by conventional liquid-liquid or liquid-solid separation techniques. The alkoxy substituted trihalopyrazine-1-oxides are prepared from the appropriate tetrahalopyrazine-1-oxide by the reaction thereof with an equivalent quantity of a metal alkoxide compound of the formula MOR wherein M is an alkali metal and R is an alkyl radical as described above. The reaction proceeds readily at temperatures of from about 10° to about 80° C., with the formation of alkali metal halide as a by-product. The contacting of the reactants is conveniently carried out in a solvent such as an alcohol and it is preferred to carry out the reaction in an alcohol having the formula ROH wherein R is the same alkyl radical as that present in the compound of formula MOR.

The alkali metal compound MOR employed as reactant in the fashion described above can be prepared by conventional procedures such as by reacting the free alkali metal with a predetermined alcohol of formula ROH. The reaction is conveniently carried out using the alcohol itself as an excess reaction medium. The resulting solution of the alkali metal alkoxide is then added to a separate solution or suspension of the polyhalopyrazine-1-oxide reactant also carried in the same alcohol. In carrying out this reaction, the polyhalopyrazine-1-oxide and the alkali metal alkoxide reactants are intimately contacted in the reaction carrier liquid or solvent at reaction temperatures indicated hereinbefore. Preferably, at least 1 molar equivalent of the pyrazine compound is present for each mole of the alkali metal alkoxide compound. A slight excess of the latter reactant can be employed, but such excess is generally to be avoided in order to suppress the formation of undesired by-products. In most cases, it is desirable to carry out the reaction at relatively low temperatures, preferably at from about 15° to 20° C., at least in its initial stages, to minimize the formation of undesired by-products. The present novel compound can be isolated from the reaction mixture by conventional procedures such as, in the case of those which are solids at ordinary temperatures, precipitation in water, washing and extraction. The crystalline products so obtained can be further purified by recrystallization. Those products which are oils or liquids at ordinary temperatures readily can be recovered by placing the reaction mixture in contact with water, and separating and recovering the resulting substantially water-insoluble oil. These products can be further purified, if desired, by chromatographic, distillation or other liquid-liquid or vapor-liquid separatory and recovery procedures.

The presence of the several sites of potential substitution on the pyrazine ring and the generalized nature of the reactions by which substituents can be placed at these sites permits the existence of various molecular isomers. In the case of the present compounds, analytical data indicate that the alkoxy (—OR) group ordinarily occupies the 6 position on the ring, the nitrogen atom bearing the oxygen atom being designated as occupying the 1 position. However, substitution in the 5 position is possible in some instances.

The compounds of the present invention have utility as pesticides when used in pesticidally-effective amounts and for this purpose, they can be employed directly or be suitably incorporated in compositions which contain other ingredients which cooperate with the active component so as to facilitate the invention and to obtain an improved and outstanding result. Such compositions can take the form of emulsifiable liquid concentrates, wettable powder or dust formulations and the like.

The emulsifiable liquid concentrates are formulations of the active pyrazine compound in a suitable organic solvent therefor, such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics.

The dust formulations are prepared by dispersing the active toxicant pesticide compound in and on a finely divided inert solid support such as diatomaceous earth, bentonite, fuller's earth, attapulgite and similar clays. For the preparation of wettable powders, the solid carrier may be mechanically ground in admixture with the active compound hereof and a surface active dispersing agent.

Any of the foregoing compositions ca nbe distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicant per million parts of applied composition.

DESCRIPTION OF THE PREFERRED EMBODIMENTS

The following examples illustrate the invention but are not to be construed as limiting the same.

Example 1

Tetrachloropyrazine (11 g.; 0.05 mole) is dissolved in 75 ml. of trifluoroacetic acid. A solution of 5 ml. of 90 percent hydrogen peroxide (~0.18 mole) in 10 ml. trifluoroacetic acid is then added over a five minute period with stirring while keeping the temperature at about 30° C. The reaction mixture is then refluxed at about 84° C. for five hours, following which it is poured into cold water. The white product which precipitates is collected on a filter, washed and dried to obtain 5 grams of product having a melting point of 216°–218° C. This product has limited solubility in water and good solubility in acetone and benzene. Elemental analysis discloses it to have carbon, chlorine and nitrogen contents of 20.57, 60.48 and 11.89 percent, respectively, as against theoretical values of 20.5, 60.5 and 12.0 percent, respectively, for the compound, tetrachloro-pyrazine-1-oxide.

Example 2.—2,3,5-trichloropyrazine-1-oxide

Following the same procedure as set forth in Example 1, except that 2,3,5-trichloropyrazine is employed as the pyrazine reactant, there is obtained the 2,3,5-trichloropyrazine-1-oxide, a white crystalline solid melting at 102°–105° C. which is very slightly soluble in water and has good solubility in acetone and benzene. Elemental analysis discloses this compound to have carbon, chlorine and nitrogen contents of 24.39, 53.02 and 13.78 percent, respectively, as against theoretical values of 24.0, 53.3 and 14.0 percent, respectively, for the compound, 2,3,5-trichloropyrazine-1-oxide.

Example 3.—Tetrabromopyrazine-1-oxide

Following the same procedure as set forth in Example 1, except that tetrabromopyrazine is employed as the pyrazine reactant, there is obtained the tetrabromopyrazine-1-oxide, an off-white crystalline solid melting at 230° C. which is insoluble in water and has moderate to good solubility in acetone and benzene. Elemental analysis discloses this product to have carbon, bromine and nitrogen contents of 11.69, 77.52 and 6.71 percent, respectively, as against theoretical values of 11.65, 77.7 and 6.8 percent, respectively, for the compound, tetrabromopyrazine-1-oxide.

Example 4.—2,3,5-tribromopyrazine-1-oxide

Utilizing the same procedure as described for Example 1, except that 2,3,5-tribromopyrazine is employed as the pyrazine reactant, there is obtained 2,3,5-tribromopyrazine-1-oxide, a white crystalline solid melting at 129°–132° C. which is insoluble in water and has moderate to good solubility in acetone and benzene. Elemental analysis discloses this compound to have chlorine, bromine, hydrogen and nitrogen contents of 14.27, 70.80, 0.58 and 7.93 percent, respectively, as against theoretical values of 14.4, 72.0, 0.3 and 8.4 percent, respectively, for the compound, 2,3,5-tribromopyrazine-1-oxide.

Example 5—2,3,5-trichloro-6-methoxypyrazine-1-oxide

Sodium metal (0.805 g.; 0.035 mole) is added to 60 ml. of methanol at 25° C. The resulting solution is then slowly added to a solution of tetrachloropyrazine-1-oxide (8.0 g.; 0.0342 mole) in 70 ml. of methanol, as contained in a flask provided with a condenser. The resulting solution is then heated on a steam bath at a temperature of about 68° C. for ¾ hour. At this point, the condenser is removed and the reaction mixture is heated to evaporate about ⅓ of the solvent. The residue is cooled and poured into cold water. There is obtained 4 g. of a white solid precipitate which is recrystallized from hexane. Elemental analysis discloses this product to have carbon, hydrogen, nitrogen and chlorine contents of 26.43, 1.24, 11.93 and 46.82 percent, respectively, as against theoretical values of 26.3, 1.3, 12.2 and 46.4 percent, respectively, for the compound, 2,3,5 - trichloro - 6-methoxypyrazine-1-oxide. This compound has a melting point of 92°–96° C. It is very slightly soluble in water and has good solubility in acetone and benzene.

Example 6.—3,5-dichloro-2,6-difluoropyrazine-1-oxide

In this operation, 3,5-dichloro-2,6-difluoropyrazine reactant is prepared by heating a solution of tetrachloropyrazine and potassium fluoride in dimethylformamide for 3½ hours at 60° C., the fluoride being present in a 10/1 molar excess. The resulting reaction product is cooled, the insoluble salts present are filtered off and the filtrate is poured over ice water to precipitate the fluorinated pyrazine compounds which are present. Analysis discloses the product, a white waxy solid, to contain 90 percent dichlorodifluoropyrazines, with the balance being made up of the trichloromonofluoro- and monochlorotrifluoropyrazine derivatives. The separated and recovered dichlorodifluoropyrazine component in turn is found to consist essentially of 3,5-dichloro-2,6-difluoropyrazine, together with a small amount of the 2,3-dichloro-5,6-difluoropyrazine isomer.

Five grams (0.0272 mole) of 3,5-dichloro-2,6-difluoropyrazine is dissolved in 37.4 milliliters of trifluoroacetic acid and to it is added a solution of 2.5 ml. (0.09 mole) of 90 percent hydrogen peroxide in 5 ml. of trifluoroacetic acid. The resulting solution is heated under reflux conditions for three hours. Approximately one-half of the solvent present is then distilled off, after which the remaining solution is cooled and poured into water to precipitate the corresponding pyrazine-1-oxide product. The latter is put in dichloromethane and dried with sodium sulfate, leaving 2.42 g. of a product made up essentially of 3,5-dichloro-2,6-difluoropyrazine-1-oxide as a white crystalline material having a melting point of 80°–89° C. which is very slightly soluble in water and highly soluble in benzene and acetone.

Example 7

In a manner similar to that described in the specification and set forth in the foregoing examples, particularly Example 5, the following compounds are prepared:

2,3,5-trichloro-6-isopropoxypyrazine-1-oxide, molecular weight 257.4, by the reaction of tetrachloropyrazine-1-oxide with sodium isopropoxide in isopropanol;

2,3,5 - tribromo - 6-(2-ethyl)hexyloxypyrazine-1-oxide, having a molecular weight of 460.7, by the reaction of tetrabromopyrazine-1-oxide with sodium 2-ethyl-hexoxide in 2-ethylhexanol;

3,5 - dichloro-2,6-difluoro-6-methoxypyrazine-1-oxide, having a molecular weight of 212.9, by the reaction of 3,5-dichloro-2,6-difluoropyrazine-1-oxide with sodium methoxide in methanol;

2,3,5-trichloro-6-dodecyloxypyrazine-1-oxide, having a molecular weight of 383.4, by the reaction of tetrachloropyrazine-1-oxide with sodium dodecoxide in 1-dodecanol.

The compounds can be employed as pesticides by distributing the compound, in a pesticidally-effective quantity usually in the form of a composition containing adjuvants to aid in dispersing the same, so as to contact directly the organisms to be controlled or, alternatively, so as to contact the growth medium or habitat of the organisms whereby eventual contact with said organisms will be established. For the control of higher plants in soil, the active pyrazine compounds ordinarily are distributed in soil in amounts of from about 0.1 to 50 pounds or more per acre so as to contact seeds and emerging seedlings of the vegetation to be controlled. For the control of lower plants such as fungal organisms, the active compounds usually are applied to growth media of said organisms in amounts to provide about 25 parts or more by weight of the active compound per million parts of said media. For the control of molds and similar growth forms occuring in various paint, paper pulp and wood-impregnating formulations, the desired pesticidal control action can be obtained by incorporating at least about 1 part or more by weight of the active compound per million parts of the formulation, and usually at least about 10 parts by weight of the active compound per million parts of formulation.

In representative operations, either tetrachloropyrazine-1-oxide or 2,3,5-trichloropyrazine-1-oxide in an aqueous emulsified composition containing about 100 parts by weight of the pyrazine compound per million parts of the aqueous composition, when applied as a soil drench at a dosage rate of 10 pounds per acre, provides complete herbicidal control of fertile soil planted with pigweed, wild mustard and crabgrass.

2,3,5-tribromopyrazine-1-oxide, tetrabromopyrazine-1-oxide, 2,3,5-trichloropyrazine-1-oxide and tetrachloropyrazine-1-oxide, at a dosage rate of 100 parts per million each, are found to give complete kill of *Staphylococcus aureus, Candida albicans, Salmonella typhosa, Mycobacterium phlei, Trichophyton mentagrophytes, Bacillus subtilis, Candida pelliculosa, Pullularia pullulans, Aspergillus terreus* and *Rhizopus nigricans*.

The tri- and tetrahalopyrazine reactants employed as starting materials in preparing compounds of the present invention can be prepared by methods well known to those skilled in the art. Thus, the tri- and tetrachloro- (or bromo) pyrazines can be prepared by the direct chlorination or bromination of pyrazine. Mixed chlorobromopyrazines, as well as tetrabromopyrazine can be produced by the action of hydrogen bromide on a solution of tetrachloropyrazine in glacial acetic acid, the tetrabrominated product being formed in major proportion as the solution is maintained at temperatures above about 100° C. Similarly, the reaction of trichloropyrazine with hydrogen bromide yields tribromopyrazine or mixed clhorobromo derivatives. Tri- and tetrafluoropyrazine as well as mixed chlorofluoropyrazines, can be produced by heating the appropriate tri- or tetrachloropyrazine compound with potassium fluoride in the presence of a solvent such as dimethylformamide, potassium chloride being produced as a by-product. The use of elevated pressures in this reaction facilitates the preparation of the tri- and tetrafluoro derivatives. Customary extraction, filtration, distillation or other isolation procedures and purification steps are used to separate the desired product from reaction mixtures.

What is claimed is:

1. The polyhalopyrazine-1-oxide compound of the formula

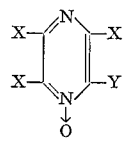

wherein each X is halogen and Y is halogen, hydrogen or —OR wherein R is alkyl.

2. The compound of claim 1 wherein each X is chlorine and Y is chlorine, corresponding to tetrachloropyrazine-1-oxide.

3. The compound of claim 1 wherein each X is chlorine and Y is hydrogen, corresponding to 2,3,5-trichloropyrazine-1-oxide.

4. The compound of claim 1 wherein each X is bromine and Y is bromine, corresponding to tetrabromopyrazine-1-oxide.

5. The compound of claim 1 wherein each X is bromine and Y is hydrogen, corresponding to 2,3,5-tribromopyrazine-1-oxide.

6. The compound of claim 1 wherein each X is chlorine and Y is methoxy, corresponding to 2,3,5-trichloro-6-methoxypyrazine-1-oxide.

References Cited

UNITED STATES PATENTS

| 2,518,130 | 8/1950 | Evans | 260—250 |
|---|---|---|---|
| 2,573,268 | 10/1951 | Miller | 260—250 |
| 3,160,559 | 12/1964 | Kano et al. | |
| 3,295,946 | 1/1967 | D'Amico | 71—94 |
| 3,310,560 | 3/1967 | Schönbeck et al. | |
| 3,429,689 | 2/1969 | Duerr et al. | 71—124 |

NICHOLAS S. RIZZO, Primary Examiner

U.S. Cl. X.R.

424—250